Sept. 20, 1966 TAKASHI TSUBOI ETAL 3,274,469
TRANSFORMER FED NON-ARCING MOTOR ACCELERATION CONTROL
FOR AN ELECTRIC CAR INCLUDING ANTI-SLIP CIRCUITRY
Filed May 6, 1963 5 Sheets-Sheet 1
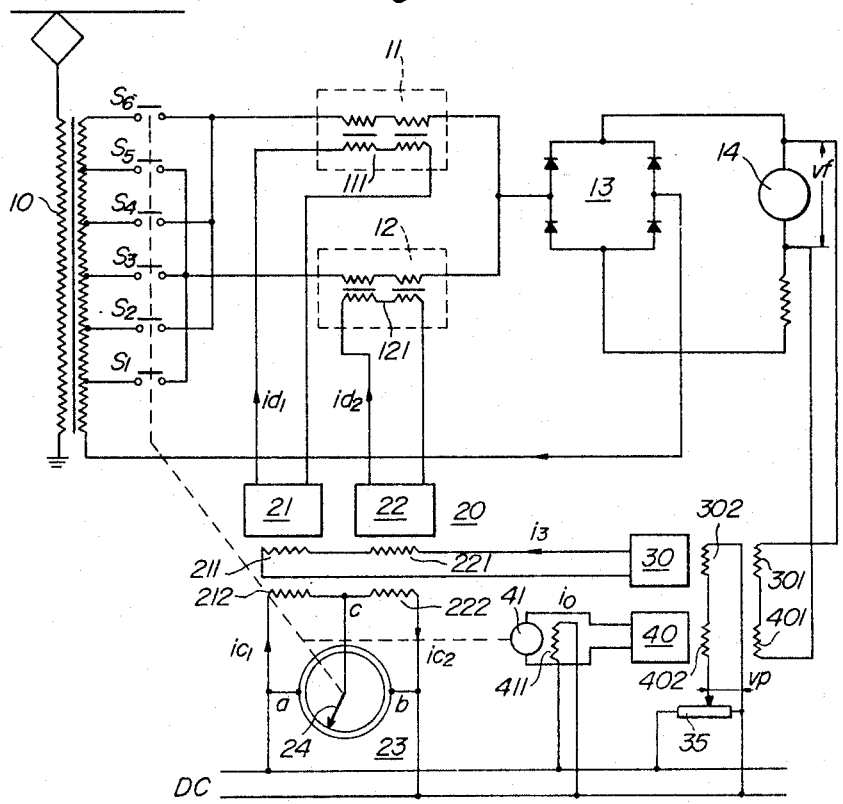
Fig. 1
Fig. 2
(1)
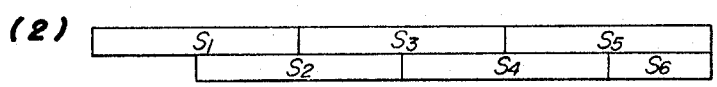
(2)
INVENTORS
TAKASHI TSUBOI
FUMIO MASUTOMI
YOSHIMITSU ONODA
BY Paul M. Craig, Jr.
ATTORNEY INVENTORS
TAKASHI TSUBOI
FUMIO MASUTOMI
YOSHIMITSU ONODA
BY Paul M. Craig, Jr.
ATTORNEY United States Patent Office 3,274,469
Patented Sept. 20, 1966

3,274,469
TRANSFORMER FED NON-ARCING MOTOR ACCELERATION CONTROL FOR AN ELECTRIC CAR INCLUDING ANTI-SLIP CIRCUITRY
Takashi Tsuboi, Fumio Masutomi, and Yoshimitsu Onoda, Katsuta-shi, Ibaragi, Japan, assignors to Hitachi, Ltd., Tokyo, Japan, a corporation of Japan
Filed May 6, 1963, Ser. No. 278,251
Claims priority, application Japan, May 11, 1962, 37/18,594
15 Claims. (Cl. 318—52)

This invention relates to electric car controlling apparatus of the type including at least one pair of supply voltage regulator devices, such as saturable reactors or grid-controlled rectifiers, provided for the nonarcing tap-changing on the secondary side of the main transformer, which is supplied from an alternating-current trolley, and is concerned particularly with those including an automatic voltage control.

The invention has for its object to provide means for sensing a voltage corresponding to the speed of the traction motor and to utilize the sensed output for automatically preventing the motor from racing due to wheel slippage.

Another object of the invention is to provide means for comparing the motor terminal voltage with the reference voltage, and rendering the supply voltage regulating devices nonconductive in alternate fashion for the purpose of automatically accomplishing the change of the voltage taps of the main transformer under nonarcing condition in synchronism with the alternate nonconductive state of said supply voltage regulating devices.

Still another object of the present invention is to provide a control system which performs the normal control of the motor safely and accurately through an integrating control system without offset, and which assures the control of the racing of motor to be performed quickly through a proportional control system—constituted by a racing-preventing circuit—without including the integrating element, whereby the racing of motor can be quickly controlled and the safe operation of motor can be performed without offset at normal times.

A feature of the invention is to employ as supply voltage regulating devices reactors of the simple series, the simple parallel, or the feedback type, electric valves, grid-controlled rectifiers, or the like. Description will be made herein on the assumption that series type saturable reactors are employed as supply voltage regulating means and a control motor as an integrating device.

The foregoing and other objects, features and advantages of the present invention will become apparent from the following description when taken in conjunction with the accompanying drawings, which schematically illustrates a few embodiments of the invention and in which:

FIG. 1 is a connection diagram of one embodiment of the invention;

FIG. 2 is a chart illustrating the relationship between (1) the change in the control currents to the saturable reactors and (2) the tap position on the main transformer during the operation;

Figure 4:
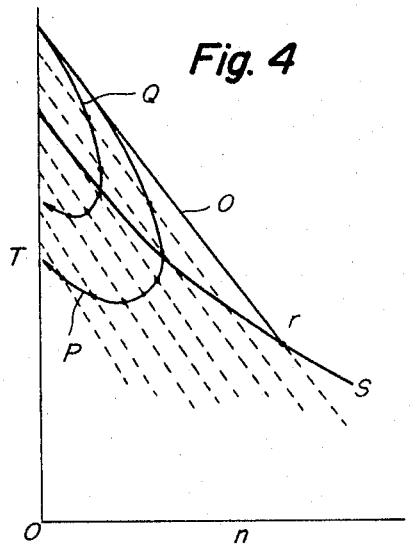
Figure 11:
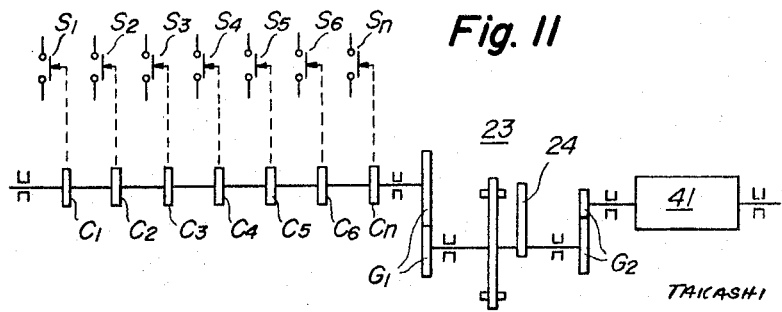
Figure 5:
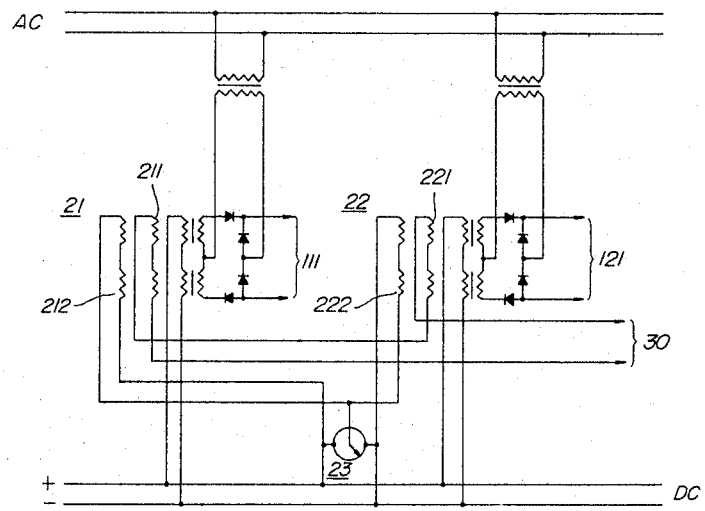
Figure 6:
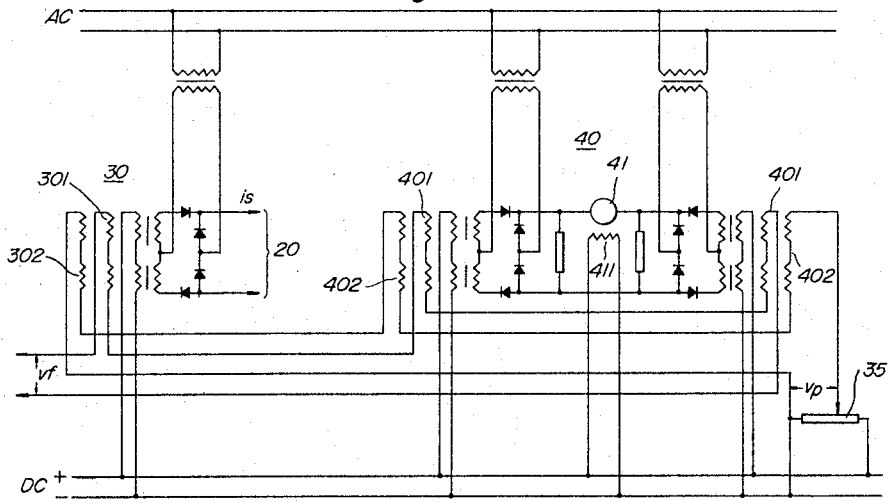
Figure 7:
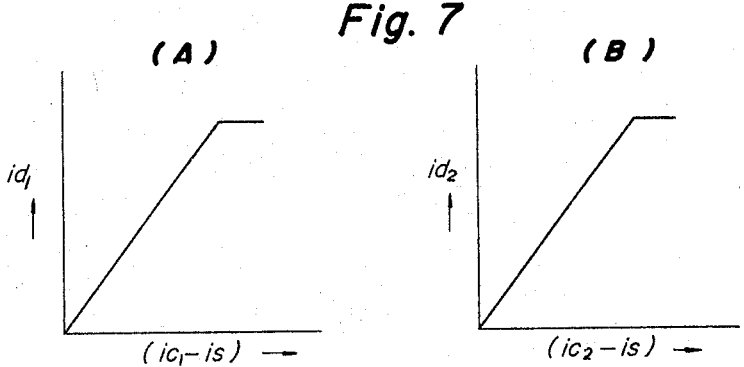
Figure 8:
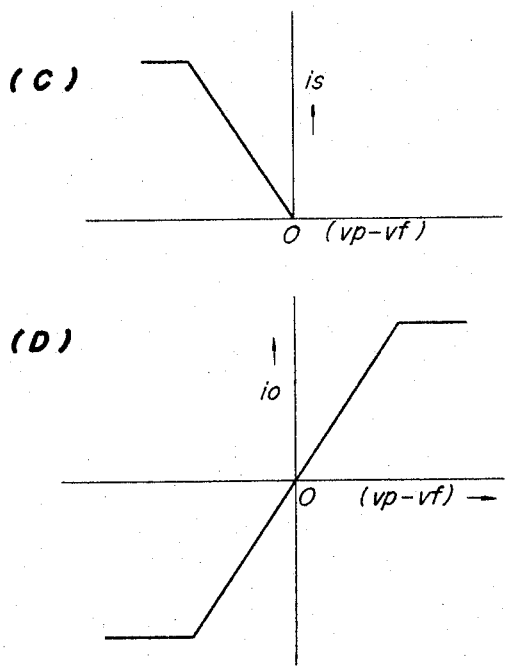
Figure 9:
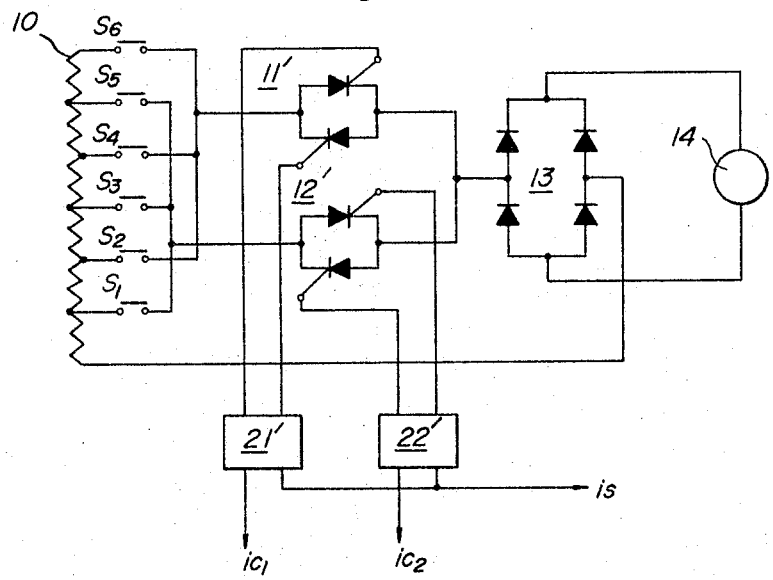
Figure 10:
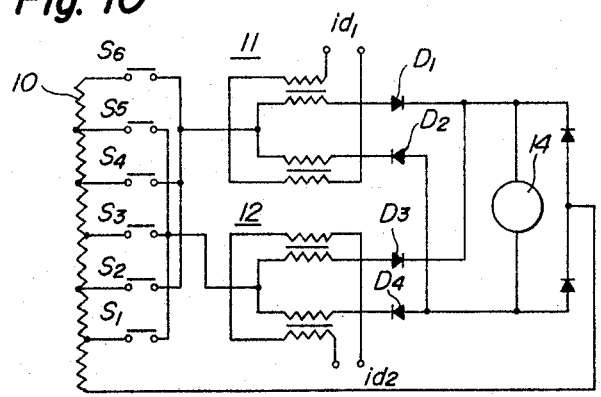

FIG. 4 graphically illustrates the principle of the re-adhesion of the electric car;

FIG. 5 illustrates one form of switching control circuit usable in the apparatus shown in FIG. 1, which employs magnetic amplifiers known per se;

FIG. 6 illustrates a form of network including the slip-preventing and the switching control circuits usable in the apparatus shown in FIG. 1 and employing magnetic amplifiers of the single and push-pull types which are known per se;

FIGS. 7A and 7B illustrate the respective characteristics of the magnetic amplifiers arranged in the circuit shown in FIG. 5;

FIGS. 8C and 8D illustrate the respective characteristics of the magnetic amplifiers shown in FIG. 6;

FIG. 9 is a simplified connection diagram illustrating another embodiment of the invention employing grid-controlled rectifier elements in place of the saturable reactors;

FIG. 10 is a diagram similar to FIG. 9, of a further embodiment of the invention which employs auto-excitation type saturable reactors as supply voltage regulator means;

FIG. 11 is a schematic showing of one form of a tap-changing mechanism; and

Figure 12:
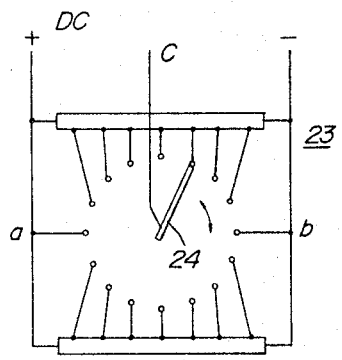

FIG. 12 schematically illustrates one form of the rotary slide rheostat.

Referring to the drawings and particularly to FIG. 1, the apparatus constructed according to the invention includes a main transformer 10 supplied from an alternating-current trolley and having a plurality of voltage taps $S_1$, $S_2$, ... $S_n$ on the secondary side. Reference characters 11 and 12 designate a pair of saturable reactors provided with respective control windings 111 and 121 for the purpose of changing the transformer taps $S_1$, $S_2$, ... $S_n$ under nonarcing condition. As observed, the output of the main transformer is supplied to a direct-current traction motor 14 through saturable reactors 11, 12 and a rectifier device 13.

A switching control device 20 is provided for alternately energizing the control windings 111 and 121 of the respective saturable reactors 11 and 12 for the purpose of rendering the saturable reactors conductive in alternate fashion and includes a pair of magnetic amplifiers 21 and 22. One of the magnetic amplifiers 21 has a primary and a secondary control winding 211 and 212 while the other magnetic amplifier 22 has a primary and a secondary control winding 221 and 222. It is to be understood that when energized the primary control windings 211, 221 each act to reduce the amplifier output whereas the secondary control windings 212, 222 each act to increase the amplifier output. The pairs of primary and secondary control windings are connected in series as illustrated. The series arrangement of the secondary control windings 212 and 222 is connected at opposite ends to the respective terminals $a$ and $b$ of a rotary slide rheostat 23 and at the mid-point $c$ to the slide finger 24 thereof. The rotary slide rheostat 23 is constructed, for example, as shown in FIG. 12. The magnetic amplifiers 21 and 22 have characteristics as illustrated in FIGS. 7A and 7B, respectively, and may take various forms as will be readily understood. FIG. 5 illustrates an ordinary single type magnetic amplifier as one form usable for such purpose.

A slip- or racing-preventing circuit 30 includes a primary and a secondary control winding 301 and 302. The primary control winding 301 is fed with the terminal voltage $V_f$ of traction motor 14 while the secondary control winding 302 is fed with the directive or reference voltage $V_p$ by way of a variable resistance 35. The circuit 30 has characteristics as illustrated in FIG. 8C having an output is only when $V_f > V_p$. As shown, the output is of circuit 30 acts to energize primary control windings 211 and 221 described hereinbefore.

A tap-changer circuit 40, like circuit 30, has two control windings, that is, a primary control winding 401 fed with the motor terminal voltage $V_f$ and a secondary control winding 402 fed with the reference voltage $V_p$. The output of the circuit 40 is positive when $V_f < V_p$ and negative when $V_f > V_p$, as observed from its characteristic curve shown in FIG. 8D. The characteristics illustrated in FIGS. 8C and 8D can be obtained with various forms of circuit. For example, as illustrated in FIG. 6, the circuits 30 and 40 may include single type and push-pull type magnetic amplifiers, respectively.

The output $i_0$ of the tap-changer circuit 40 is fed to a control motor 41 having a field winding 411 (FIG. 1). The control motor 41 is driven in accordance with the output of the circuit 40 to rotate the finger 24 of rotary slide rheostat 23, which accordingly operates a tap-changing mechanism for the transformer 10 through the operative connection therewith. The tap-changing mechanism includes a cam mechanism including a series of cams $C_1$, $C_2$, . . . $C_n$, as illustrated in FIG. 11. It will be understood that the control motor 41 operates to shift the tap upwardly when the output of circuit 40 is positive and downwardly when it is negative.

In the starting operation, a direct-current source D.C. is thrown in and a reference voltage $V_p$ is fed to the secondary control windings 302 and 402 of circuits 30 and 40. At the first, however, since the terminal voltage $V_f$ of the motor 14 is zero, circuit 30 delivers no output and circuit 40 alone delivers an output, which is positive. As the result, control motor 41 acts to rotate the slide finger 24 of the rotary slide rheostat 23 in a counterclockwise direction from point $a$ to $b$. Accordingly, the control current $ic_2$ flowing through the secondary control winding 222 of magnetic amplifier 22 and hence its output or the control current $id_2$ supplied therefrom to the saturable reactor 12 is reduced to increase the impedance of the latter. On the other hand, the control current $ic_1$ flowing through the magnetic amplifier 21 of the switching control device 20 is increased and its output or the control current $id_1$ directed therefrom to saturable reactor 11 is correspondingly increased to reduce the impedance of the latter. In this manner, as the slide 24 approaches $b$, the impedance of one of the saturable reactors 11 is reduced to zero whereas the impedance of the other saturable reactor is increased to become infinitely large. Simultaneously therewith, the tap-changing mechanism under control of the control motor 41 is operated to throw in the tap contact $S_1$. On this occasion, however, it will be recognized that no current flows through the contact $S_1$ and no arcing is caused since the saturable reactor 12 has an infinitely large impedance at this instant. As control motor 41 continues to rotate to move the slide 24 toward point $a$, the control current of magnetic amplifier 22 is increased to cause a control current $id_2$ to flow through saturable reactor 12 thereby slowly to reduce its impedance. In this manner, a current is caused to flow through motor 14 and the motor is started. In the meantime, the side of magnetic amplifier 21 operates in the opposite manner to increase the impedance of saturable reactor 11 until the slide 24 reaches point $a$ when the reactor 11 obtains an infinitely large impedance and the impedance of reactor 12 is reduced to zero. At this point, the tap-changing mechanism is operated to throw in the next tap contact $S_2$. At this moment however, no arcing is caused because of the infinitely large impedance of the reactor 11.

Such tap-change operation is further repeated to increase the motor terminal voltage $V_f$, as will readily be understood. The relationship of the control currents $id_1$ and $id_2$ for respective reactors 11 and 12 and the tap contacts thrown in during the above-described starting operation is as illustrated in FIG. 2. As will be observed, it is arranged so that when contact $S_3$ is thrown in, contact $S_1$ is thrown out and when contact $S_4$ is thrown in, contact $S_2$ is thrown out. The above operation is terminated when the motor terminal voltage $V_f$ and the reference voltage $V_p$ come to have the same value, and thereafter the traction motor 14 operates upon a prescribed voltage.

As is well known, if the traction motor 14 delivers a tractive force T in excess of the adhesion or frictional engagement between the driving wheels of the car and the track, the driving wheels will slip, the static friction between the wheels and track being converted into a dynamic friction, and the adhesion is reduced. On this occasion, since the dynamic friction has a characteristic property as illustrated by the curve S in FIG. 4, the adhesion or frictional engagement is continued to be reduced to increase the speed $n$ of the traction motor even to an extent such that the equipment associated may be damaged. If the source voltage is not controlled, the motor continues to operate falling along curve O (one of the speed tractive force characteristic curves paramated source voltage) in FIG. 4 until point $\gamma$, where curve O intersects the dynamic friction curve S, is reached, that is, the adhesion between the driving wheels and track is resumed. The slip speed $(n)$—time $(t)$ characteristic of traction motor 14 in this case is illustrated by curve $x$ in FIG. 3.

Figure 3:
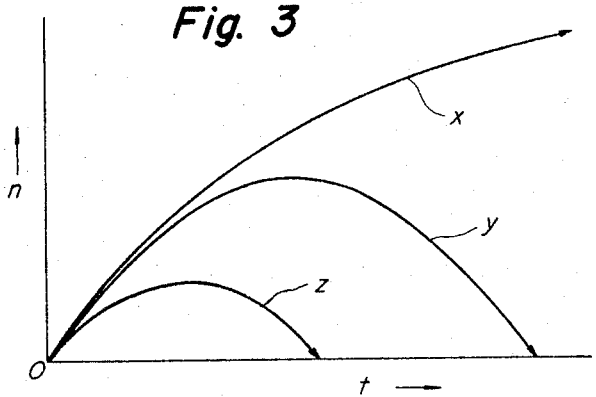
FIG. 3 is a graphical representation of the re-adhesion characteristic of an electric car equipped with the controlling apparatus of the invention.

If the motor starts to race or the driving wheels start to slip, the motor terminal voltage $V_f$ is raised because of the rise in the motor speed until $V_f$ exceeds the reference voltage $V_p$ and the sign of the output of the tap-changer circuit 40 is reversed to become negative to rotate the control motor 41 clockwise. As the result, the tap-changing mechanism operates to change the voltage taps $S_1$, $S_2$, . . . $S_n$ in the reverse direction to reduce the motor terminal voltage. Thus, the motor in this case exhibits characteristics as illustrated in FIG. 4 by the successive dotted lines parallel to line O. In other words, the motor has an overall racing characteristic as illustrated by curve P and the adhesion is restored in a relatively short period of time as illustrated in FIG. 3 by curve $y$.

In this case, the response of the tap-changer circuit 40 is sluggish as it includes an integrating element such as control motor 41. Also, any manual device provided, for the purpose would result in a sluggish response as it is only operated for re-adhesion after the indication on the panel has been taken notice of by the engineer. In contrast to this, the slip-preventing circuit 30 starts to deliver an output $is$ as soon as $V_f$ exceeds $V_p$ to energize the primary control windings 211 and 221 of respective magnetic amplifiers 21 and 22 of the switching control device 20 so that the output or control currents $id_1$, $id_2$ of the magnetic amplifiers 21 and 22 supplied to respective saturable reactors 11 and 12 are reduced to increase the impedance of the saturable reactors. Accordingly, as a result of the increase in impedance in saturable reactors 11 and 12 the terminal voltage $V_f$ of the motor 14 is rapidly reduced to decrease its tractive force T. The traction motor, therefore, has a racing characteristic as illustrated in FIG. 4 by line Q and can restore the adhesion in an extremely short period of time, thus preventing any damage of the equipment. The speed characteristic of the motor in this case is illustrated in FIG. 3 by line $z$, the abscissa $n$ representing the motor speed during such wheel slippage.

With the apparatus shown in FIG. 1 and having series-connected saturable reactors, a circulating current may be caused during the tap change when slide 24 is positioned intermediate points $a$ and $b$ as the impedances of the respective reactors then reach an intermediate value allowing the voltage between the taps to be impressed upon the series connection of the reactors. Such circulating current can be prevented by use of reactors of the auto-excitation or self-excitation type instead of the series type, as illustrated in FIG. 10. This is due to the insertion of rectifiers $D_1$, $D_2$, $D_3$ and $D_4$ for auto-excitation. The same purpose can be served by use of an arrangement including grid-controlled rectifier elements if magnetic amplifiers 21 and 22 in the switching control device 20 are replaced by automatic pulse shifters. In the circuit of FIG. 9, automatic pulse shifters are employed, grid-controlled rectifier elements 21' and 22' respectively corresponding to magnetic amplifiers 21 and 22 in FIG. 1. As will be understood, the taps $S_1$, $S_2$, . . . $S_n$ are changed when either one of the rectifier elements has been rendered nonconductive depending upon the magnitudes of the control currents $ic_1$ and $ic_2$.

It will be recognized that any of these modifications, solely employing components well known in the art, operates in the same manner as described hereinbefore in connection with FIG. 1.

Though a few embodiments of the present invention have been shown and described herein, it is to be understood that the invention is not to be restricted to the details set forth but various changes and modifications can be made without departing from the spirit of the invention or from the scope of the appended claims.

What is claimed is:

1. An electric car controlling apparatus for switching the supply voltage of the motor and preventing damage due to slippage thereof, comprising a main transformer supplied from an alternating-current trolley and having a plurality of voltage taps in the output, a direct-current traction motor, connecting means operatively connecting a selected one of said taps with said traction motor including rectifier means operable to rectify the A.C. current from said transformer into D.C. current and at least one pair of supply voltage regulating means operatively interposed between said transformer and said rectifier means, switching control means operable to change said voltage taps under substantially non-arcing condition while controlling said supply voltage regulating means, means operatively connected with said motor for producing a voltage proportional to the speed thereof, and a slip-preventing circuit means operable to sense said voltage proportional to the speed of the motor and operatively connected with said supply voltage regulating means to raise the impedance of all of said supply voltage regulating means in accordance with the sensed output.

2. An electric car controlling apparatus for switching the supply voltage to the motor under substantially non-arcing conditions, comprising a main transformer supplied from an alternating-current trolley and having a plurality of voltage taps in the output, a direct-current traction motor, connecting means operatively connecting said transformer with said traction motor including rectifier means for rectifying the A.C. current from said transformer into D.C. current, at least one pair of supply voltage regulating means interposed between said main transformer and said rectifier means, and switching means selectively connecting said regulating means with a selected one of said voltage taps; switching control means operatively connected with said supply voltage regulating means to change said voltage taps under substantially non-arcing conditions while controlling said supply voltage regulating means, a reference voltage, means for producing a voltage proportional to the speed of said motor, and tap-changing circuit means operatively connected with said switching control means and operable to compare the voltage proportional to the speed of said motor with reference voltage for controlling said switching control means in accordance with the integrated value of the compared voltage difference.

3. An electric car controlling apparatus according to claim 2, further comprising slip-preventing circuit means operatively connected with said supply voltage regulating means and operable to compare the voltage proportional to the speed of said motor with the reference voltage to raise the impedance of all of said voltage regulating means according to the voltage difference compared.

4. An electric car controlling apparatus according to claim 1, in which each of said supply voltage-regulating means includes a controlled rectifier controlled to vary the impedance thereof.

5. An electric car controlling apparatus according to claim 1, in which each of said supply voltage-regulating means includes a self-excitation-type saturable reactor.

6. An electric car controlling apparatus according to claim 2, in which said switching control means and said tap-changing circuit means include a control motor and a rotary slide rheostat operatively connected with said motor whereby said rheostat controls said voltage regulating means and said motor drives said rheostat and said tap-changing circuit means.

7. A electric car controlling apparatus for preventing damage during slippage, comprising a main transformer supplied from A.C. trolley and having a plurality of voltage taps in the output thereof, a traction motor, circuit means supplying a D.C. voltage from said main transformer to said motor including a rectifier and at least one pair of supply voltage regulating means interposed between said main transformer and said rectifier, switching control means operatively connected with said supply voltage regulating means, to change said voltage taps under non-arcing condition while controlling said supply voltage regulating means, means for producing a voltage proportional to the speed of said motor, a reference voltage, tap-changer circuit means operable to compare the voltage proportional to the speed of said motor with the reference voltage and operatively connected with said switching control means for controlling said switching control means in accordance with the integrated value of the voltage difference compared, and slip-preventing circuit means operable to compare the voltage proportional to the speed of said motor with a reference voltage and operatively connected with said supply voltage regulating means to raise the impedance of all of said supply voltage regulating means according to the voltage difference compared.

8. An electric car controlling apparatus according to claim 7 in which each of said supply voltage regulating means includes a controlled rectifier having a pair of main electrodes and a control electrode, one of said main electrodes being operatively connected with a selected one of said voltage taps, the other main electrode being operatively connected with said rectifier means, and said control electrode being operatively connected with said slip-preventing circuit means and said switching control means and being controlled by both said switching control means and by said slip-preventing means to control in turn, the impedance between the corresponding main electrodes.

9. An electric car controlling apparatus according to claim 7 in which each of said supply voltage regulating means includes saturable reactor means.

10. An electric car controlling apparatus, comprising:
a main transformer supplied from an alternating current source and having a plurality of voltage taps in the output thereof, a first output circuit including first switching means and a second output circuit including second switching means, successive taps being adapted to be alternately and selectively connected with the first and second output circuit, respectively, by way of said first and second switching means,
a direct-current traction motor for driving the wheels of the car, first impedance means operatively connected with the first output circuit, second impedance means operatively connected with the second output circuit, circuit means including rectifier means for converting A.C. current into D.C. current and operatively connected between said first and second impedance means and said traction motor,
impedance control means operatively connected with said first and second impedance means for applying to said first and second impedance means, respectively, first and second control signals to change the impedance thereof between a very low value and a very high value,
switch driving means operatively connected with said first and second switching means and operable to alternately open and close the first and second switching means to open the switch means previously connected with a tap and to close the switch means to establish a connection with the next selected tap under substantially non-arcing conditions,
a reference voltage, means for producing a voltage proportional to the speed of the motor, and sensing means operatively connected with said reference voltage and the speed proportional voltage to produce a signal proportional to the difference between the reference voltage and the voltage proportional to the speed of the motor,
an integrating means operatively connecting said sensing means with said impedance control means for controlling said impedance control means in accordance with the integrated value of said signal from said sensing means.

11. An anti-racing control system for controlling the operation of a direct-current motor from an alternating-current source, especially for cars driven by said motor comprising:
a direct-current electric motor,
transformer means connected with said alternating-current source and having a plurality of output taps,
circuit means operatively connecting said transformer means with said motor including variable impedance means, rectifier means between said impedance means and said motor, and selectively operable switch means operatively connecting said impedance means with a pre-selected one of said taps,
sensing means for sensing the speed of said motor and obtaining a signal proportional thereto,
and control means operatively connected with said sensing means, said impedance means and said switch means for controlling said impedance means and said switch means in dependence on the signal obtained from said sensing means including means for automatically increasing said impedance means while changing the tap connection to assure operation of said switch means under substantially non-arcing conditions.

12. The combination according to claim 10, further comprising detecting means detecting the racing of the wheels of the car, and slip-preventing means operatively connected between said detecting means and said impedance control means to raise the impedance of all of said impedance control means to said very high value in accordance with the output signal from said detecting means indicating a racing of the wheels of the car.

13. An anti-racing control system for controlling the operation of a direct-current motor energized from an alternating-current source, comprising:
a direct-current electric motor,
transformer means connected with said alternating-current source and having a plurality of output taps,
circuit means operatively connecting said transformer means with said motor including voltage regulating means, rectifier means between said voltage regulating means and said motor, and selectively operable switch means operatively connecting said voltage regulating means with a pre-selected one of said taps,
sensing means for sensing the speed of said motor including means for obtaining a control voltage,
and means operatively connected with said sensing means, said voltage regulating means and said switch means for controlling said voltage regulating means and said switch means in dependence on the signal obtained from said sensing means including control means for simultaneously controlling said switch means and said voltage regulating means in such a manner that said switch means is operated only under substantially non-arcing conditions.

14. The combination according to claim 13, wherein said control means include actuating means operatively connected with said switch means, drive means operatively connected with said actuating means, race-preventing circuit means, tap-changing circuit means, means for applying the signal of said sensing means to said two last-mentioned circuit means, means operatively connecting said tap change circuit means with said driving means, magnetic amplifier means, means for connecting said race-preventing circuit means with the input of said magnetic amplifier means, the output of said amplifier means being connected with said voltage regulating means.

15. An anti-racing control system for controlling the operation of a direct-current motor energized from an alternating-current source, comprising:
a direct-current electric motor having an armature,
transformer means connected with said alternating-current source and having a plurality of output taps,
circuit means operatively connecting said transformer means with said motor including a pair of voltage regulating means, rectifier means between said voltage regulating means and said motor, and selectively operable switch means operatively connecting said voltage regulating means with a pre-selected one of said taps,
sensing means for sensing the speed of said motor including means for obtaining a control voltage proportional to the voltage across the armature of said motor,
and means operatively connected with said sensing means, said voltage regulating means and said switch means for controlling said voltage regulating means and said switch means in dependence on the signal obtained from said sensing means including control means for simultaneously controlling said switch means and said voltage regulating means in such a manner that said switch means is operated only under substantially non-arcing conditions.

References Cited by the Examiner

UNITED STATES PATENTS

| | | | |
|---|---|---|---|
| 1,682,413 | 8/1928 | Parks et al. | 318—394 X |
| 1,941,887 | 1/1934 | Fleischammer | 318—401 X |
| 2,237,008 | 4/1941 | McNairy | 318—344 X |
| 2,482,101 | 9/1949 | Cooper | 318—344 X |
| 2,558,086 | 6/1951 | Herchenroeder | 318—513 X |
| 2,571,708 | 10/1951 | Graves | 318—513 X |
| 2,611,117 | 9/1952 | Hibbard | 318—414 |
| 2,622,239 | 12/1952 | Bracutt | 318—513 X |
| 2,635,219 | 4/1953 | Blondet | 318—414 X |
| 2,708,260 | 5/1955 | Comstock | 318—343 X |
| 2,743,409 | 4/1956 | Howes | 318—343 X |
| 2,804,583 | 8/1957 | Genuit | 318—344 X |
| 2,805,378 | 9/1957 | Blondet et al. | 318—414 |
| 2,916,685 | 12/1959 | Genuit | 318—343 X |
| 2,967,270 | 1/1961 | Drenning | 318—344 X |
| 2,982,907 | 5/1961 | Long et al. | 318—145 X |
| 3,046,464 | 7/1962 | Miller | 318—331 X |
| 3,181,050 | 4/1965 | Berman | 318—331 |

FOREIGN PATENTS 734,700    8/1955    Great Britain.

ORIS L. RADER, *Primary Examiner.*

MILTON O. HIRSHFIELD, *Examiner.*

T. LYNCH, *Assistant Examiner.*